United States Patent
Rosberg et al.

(12)

(10) Patent No.: US 6,169,290 B1
(45) Date of Patent: Jan. 2, 2001

(54) METHOD AND MEASURING DEVICE FOR MEASURING AT AN ENVELOPE SURFACE

(75) Inventors: Lars Tomas Ragnar Rosberg; Mats Ola Stark, both of Karlstad (SE)

(73) Assignee: Valmet-Karlstad AB, Karlstad (SE)

(*) Notice: Under 35 U.S.C. 154(b), the term of this patent shall be extended for 0 days.

(21) Appl. No.: 09/137,792

(22) Filed: Aug. 21, 1998

Related U.S. Application Data

(60) Provisional application No. 60/062,988, filed on Oct. 22, 1997.

(30) Foreign Application Priority Data

Aug. 22, 1997 (SE) .................................................... 9702945

(51) Int. Cl.⁷ ........................................................ G01B 5/25
(52) U.S. Cl. ............................................ 250/559.3; 33/533
(58) Field of Search ........................ 250/559.29, 559.3, 250/559.39, 559.48, 216; 356/375, 376; 33/228, 533, 551, 553, 645, DIG. 21

(56) References Cited

U.S. PATENT DOCUMENTS

| | | |
|---|---|---|
| 3,923,402 | 12/1975 | Turcotte . |
| 4,725,738 | 2/1988 | Lysen . |
| 5,587,051 | 12/1996 | Ostermayer et al. . |
| 5,605,097 | 2/1997 | Ruckl et al. . |
| 5,617,645 * | 4/1997 | Wick et al. ...................... 250/559.39 |

FOREIGN PATENT DOCUMENTS 0 816 799 A2   6/1997 (EP) .

WO 96/04423   6/1995 (WO) .

OTHER PUBLICATIONS

Harald Falk, Measurement of Yankee Geometry During Production; Creping and Drying, 1989 Tissue Making Seminar, pp. 75–78 (Oct. 5–6).

* cited by examiner

Primary Examiner—John R. Lee
Assistant Examiner—Kevin Pyo
(74) Attorney, Agent, or Firm—Alston & Bird LLP

(57) ABSTRACT

A method for, without contact and with the aid of a measuring device, measuring in connection to an envelope surface of a measured object with respect to its cylindricity and/or its straightness relative to a straightness reference arranged parallel with the axis of rotation of the measured object, which measuring device besides said straightness reference comprises a measuring stand and a measuring carriage at which at least one measuring means is arranged, which measuring carriage is traversed along a support member parallel to said axis of rotation. According to the invention the measurement commences with a starting position for the measuring means relative the straightness reference and the measured object being determined, whereby a first measurement is performed for this starting position, after which the measuring means is moved to a further position along the support member while these new positions are continuously determined relative each other or said starting position, whereupon a measurement occurs. A laser beam is used as straightness reference, said laser beam being protected from external influence along at least a part of its length by a protective device. The invention also relates to a measuring device of the type described.

24 Claims, 3 Drawing Sheets

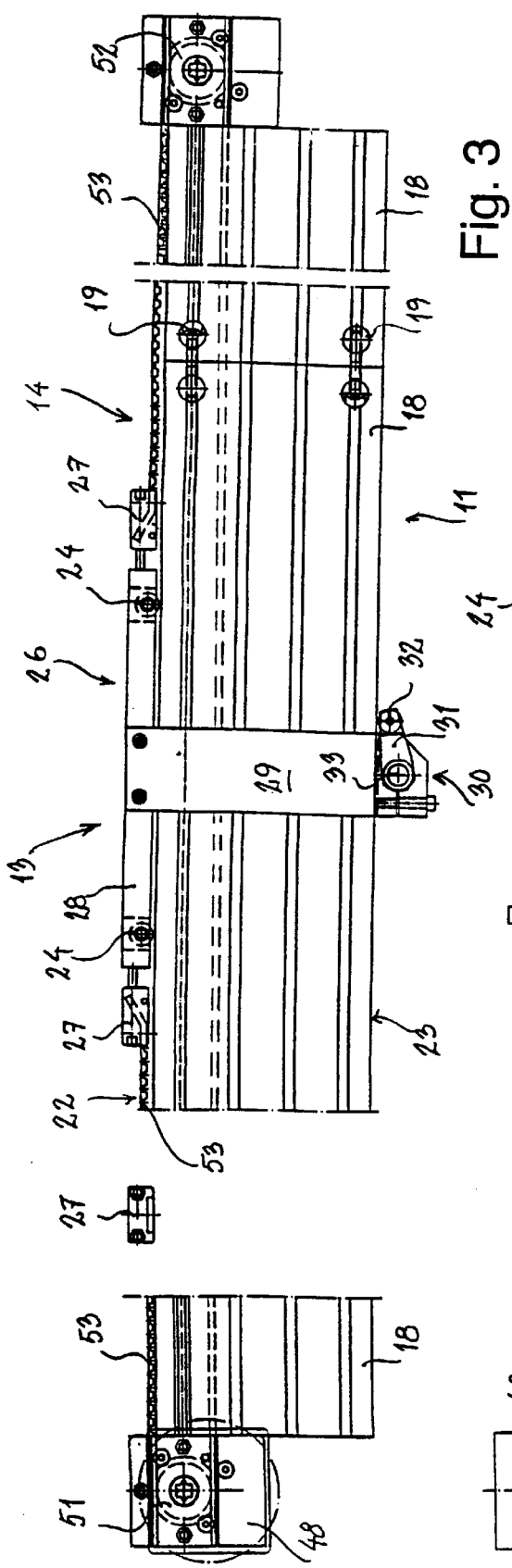
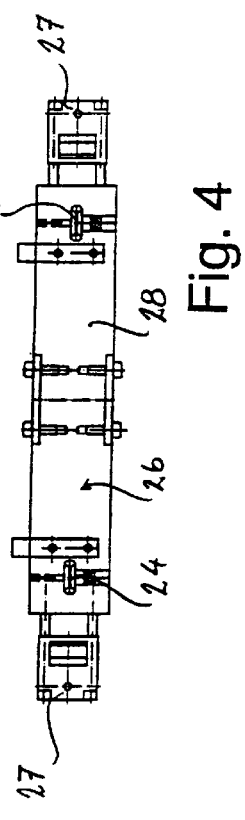
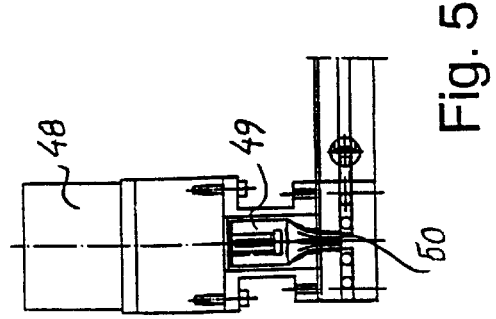
Fig. 3
Fig. 4
Fig. 5

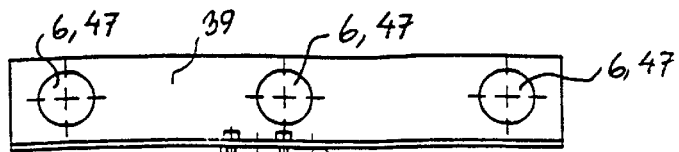
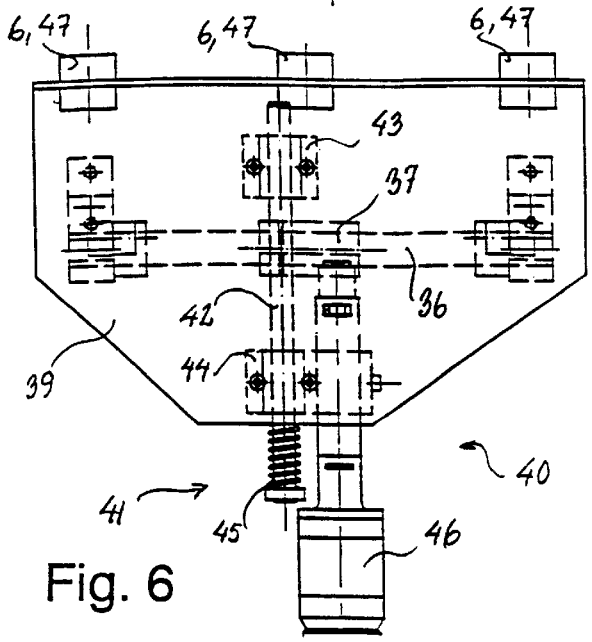
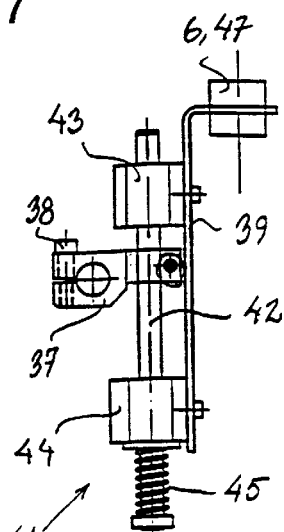
Fig. 7
Fig. 6
Fig. 8
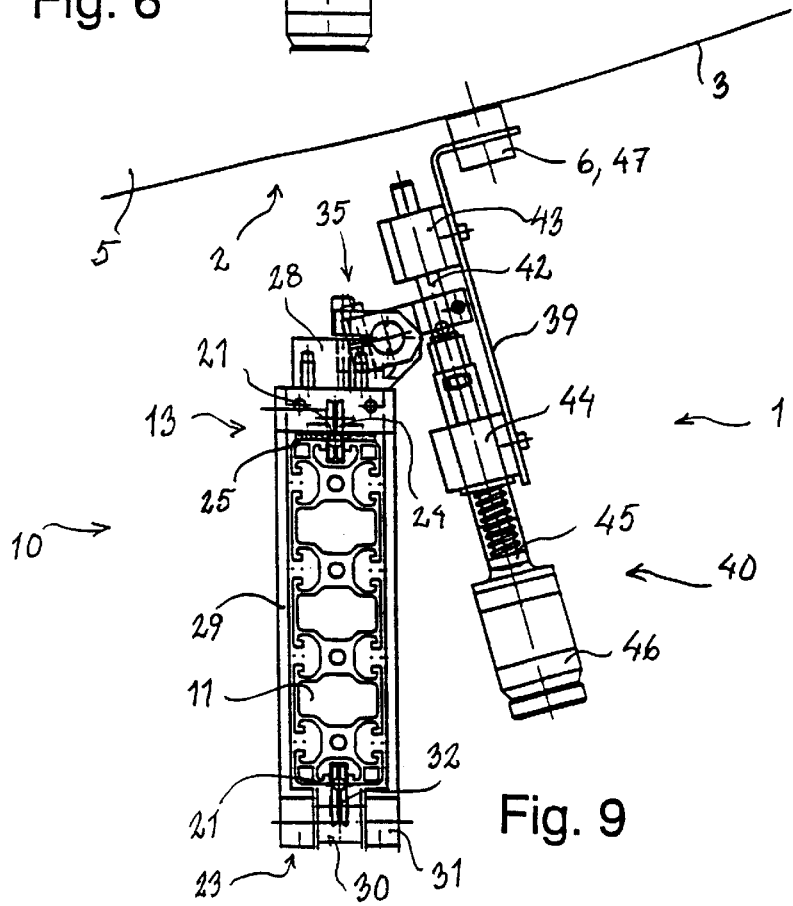
Fig. 9

METHOD AND MEASURING DEVICE FOR MEASURING AT AN ENVELOPE SURFACE

CROSS-REFERENCE TO RELATED APPLICATIONS

This application claims the benefit of U.S. Provisional Application Ser. No. 60/062,988, filed Oct. 22, 1997.

FIELD OF THE INVENTION

The present invention relates to a method and apparatus for measuring an envelope surface of an object such as a roll or cylinder of a papermaking machine.

BACKGROUND OF THE INVENTION

Substantially all machines include a larger or smaller number of machine elements which are in the shape of cylindrical bodies that rotate about an axis of rotation during operation. In a paper machine, for instance, such machine elements consist primarily of either rolls or drying cylinders such as Yankee cylinders. The rolls are usually used to influence a continuous material web in one or more roll nips through which the web runs; to transfer some form of liquid, mixture or the like to said material web; and also to support, guide and propel the web. The drying cylinders are used to dry the moving web before it is finally reeled to a finished reel of paper. The drying cylinder has a hollow, thin-walled drum, heated by steam, which has a polished envelope surface over and around which the moist material web is moved in contact with the surface so that considerable heat can be transferred to the web. In view of this heat transfer the drum has relatively large diameter in order to facilitate the necessary drying.

Common to said machine elements is that, due to their function and because they shall not influence the properties of the moving paper web in an uncontrolled and thus negative manner, they should normally be either as long as is technically possible; perfectly straight in their longitudinal extension, i.e., the envelope surface is parallel to said axis of rotation or cambered as in the specific case of a Yankee cylinder where instead of the actual cylinder being perfectly straight a carefully adjusted curvature is sought (a camber achieves the best possible uniformity in linear loading of the material web); and also perfectly cylindrical, i.e., that their physical cross section coincides exactly with the rotationally symmetrical cross section of the relevant machine element having one and the same radius around the axis of rotation for any imagined cross section along this axis. Any deviation, such as an incorrect or discontinuous camber and/or out of roundness, thus always affects the pressing, operability and, in the case of Yankee cylinders, the creping. Depending on how and where these deviations appear, the paper produced in the paper machine will not achieve the uniform paper properties striven for as far as possible.

Measurement and inspection of the envelope surface of a measured object, e.g., a Yankee cylinder, are relatively simple to perform when it is not in operation and a great deal of information can therefore be obtained. The shape of the envelope surface can be compared, for instance, with the rotationally symmetrical cross section described above in order to determine the size and any variation in the cylindricity or the straightness profile of the measured object. For the sake of simplicity the word "straightness" is used instead of the expression "straightness profile". Furthermore, deposits, corrosion, wear patterns and the magnitude of this wear can be observed or measured. However, the shape of the Yankee cylinder's envelope surface, and thus the properties of said cylinder, are very different during operation from when it in stationary, because of the unavoidable deformations that occur during operation. Said deformations are caused primarily by three different loads, viz. linear pressure or loading from press rollers, an internal steam pressure and temperature forces.

If the measured object consists of a drying cylinder, the temperature forces mentioned above are caused by heating from the water vapor used for the drying process, which affects the shape and dimensions of the drying cylinder.

These stresses arise because the construction can never be completely homogeneous and the measured object, particularly in the case of a thin, hollow drum which is also subjected to many other forces such as centrifugal force, linear pressure, steam pressure, vibration forces, etc., is always deformed to a greater or lesser extent during operation. Even extremely slight changes in the parts of the machine element give rise to friction, wear and, in the worst case, even an increased risk of rupture in the moving material web, which always entails extremely high costs. It is therefore vital to arrive at a satisfactory method of correctly measuring the envelope surface even during full operation of the paper machine.

In a previously suggested measuring device, e.g., "Tissue Making '89: Creping and Drying", Oct. 5–6, 1989 in Karlstad, Sweden, VALMET Paper Machinery, Uddeholm Strip, pages 75–78, a distance transducer stated to be a "non contact eddy-current type displacement transducer" is used for measuring the envelope surface of a Yankee cylinder. This "displacement transducer" is supposed to enable measurement of the distance between the envelope surface and the transducer with an accuracy of $\pm\frac{1}{100}$ mm when the cylinder is in full operation which, as established below, is not the case. Carried by a movable measuring carriage, the transducer is moved along a device travelling longitudinally along the Yankee cylinder and included in said measuring means, which is suitably secured to the stand of the doctor blade, or the doctor-blade beam, and transverse to the paper machine. Situated at a specific first position along and close to the envelope surface of the Yankee cylinder, the transducer emits an extremely accurate signal which is thus proportional to the distance to said envelope surface. After one complete turn of the drying cylinder, therefore, the cylindricity of the envelope surface for this first position can be determined with relatively great precision.

However, it is in practice impossible to subsequently move the transducer along the envelope surface of the cylinder to a specific second, third, and so on position absolutely in line with the first position, and at the same time completely parallel with the axis of rotation of the cylinder with an accuracy equal to or better than the resolving power of the transducer mentioned above. When measuring a straightness profile, therefore, the measurement performed for a specific first position must in some way be related to corresponding measured values for every other position along the cylinder. In said measuring device, therefore, a taut metal wire, e.g., a piano wire, is used as a straightness reference, this reference wire being arranged as best possible between two attachment devices in a measuring stand arranged in said measuring device parallel to the envelope surface of the cylinder and extending from the drive side of the paper machine across the entire length of the cylinder close to its downstream side.

Due to the unavoidable physical properties of the straightness reference, however, the measured values obtained acquire a number of unavoidable measuring errors. One of the reasons is the fact that a certain apparently slight, but due to the accuracy of the measurements still not negligible, sag occurs which is greatest at the middle of the wire and the measured value in the measuring direction of the transducer will thus naturally also be incorrect. The magnitude of this sag varies greatly depending on the tension to which the wire is subjected and also on the stretch and creep occurring in the wire as a result of this tension.

In said measuring device an attempt to solve this problem has been made by applying a specific tension in the wire firmly anchored to the measuring device by one end, with the aid of a weight attached at the other, free end of the wire. Since it is arranged to extend over and round a rotatable member arranged at the opposite end of the measuring device from the fixed attachment, the wire will always be kept taut. How much this weight weighs has thus been calculated and chosen so that the wire tension obtained will be very close to the yield point of the wire used so that its suspension and curvature are minimized maximally without risking a break in the wire.

The measuring means can thereafter be adjusted laterally to a fixed position in relation to the reference wire for each selected measuring position along the envelope surface of the Yankee cylinder.

Since the length of the reference wire must at least be equal to the length of the object being measured which in paper mills used nowadays may be more than 8 meters, as well as the measuring accuracy being ±1/100 mm, it will be understood that the unavoidable sag in the wire constitutes an extremely considerable problem which must be determined, despite maximum wire tension having been applied for the reference wire, and the measured values obtained by the transducer for each new measuring position along the measured object must be corrected in accordance with the change in position that has thus occurred in the measuring direction of the transducer.

In the described measuring device the measured values may be reported in isometric form, for example, so that a topographic map of the envelope surface is drawn showing the irregularities thus ascertained in the longitudinal and transverse directions on said envelope surface. Due to the proximity of the measuring device to the paper machine other error sources arise with the use of a straightness reference consisting of a reference wire, such as air turbulence caused by the rotating cylinder and by the moving material web, vibrations, collections of dust and paper fluff, liquid spray, etc. Thus, to reduce the influence of the above-mentioned error sources, the straightness reference must be checked, and possibly cleaned, and re-adjusted prior to each measurement and even during each measurement if said measurement comprises extended measurement sequences.

Furthermore, in the known measuring device the measuring carriage on which the measuring means is fitted must be pushed manually along the measuring beam and it is therefore extremely complicated to obtain any exact measuring positions in the cramped and hazardous space for the operator in the area around the doctor blade. This results in relatively long measuring times for each measurement sequence and the measurements can therefore really only be performed in a more or less efficient and safe manner on a paper machine which is temporarily out of operation, e.g., during repairs or service of the drying cylinder which, as ascertained above, gives a completely different and poorer measurement result—exactly the problem the known device was intended to remedy.

SUMMARY OF THE INVENTION

The main object of the present invention is to provide an improved method and an improved device for measuring at the envelope surface of at least one object to be measured with respect to its cylindricity and/or straightness so that the above problems are eliminated or at least greatly reduced.

A second object of the present invention is to provide a method and a device for completely automatically and while simultaneously performing measurements, pass a transducer or measuring means, without contact, along a measuring stand substantially parallel with the cylindrical body or measured object to be measured and at the same time automatically collect, process and visually present the result of said measurement.

A third object of the invention is to provide a method and a device for, as far as possible, obtaining an improved straightness reference which lacks or at least minimizes the errors and deficiencies that were unavoidable in the straightness references used hitherto.

A fourth object of the invention is to provide a method and a device for protecting said improved straightness reference from substantially all external influence.

A further object of the invention is to provide a method and a device for performing said measurement of the envelope surface of a measured object during full operation of the machine in which said measured object is included.

The method according to the invention is characterized in that the measuring commences with a starting position for the measuring means relative the straightness reference and the measured object being determined, which starting position comprises an initial position for the rotating measured object, a current position along the support member and a position in radial direction from the envelope surface of the measured object. A first measurement is performed for this starting position and the measuring means is thereafter moved to at least one more position along the support member while this or these new positions are continuously determined in relation to each other or said starting position. A measurement occurs in said measuring area at each position and a laser beam is used as straightness reference, said laser beam being generated by a laser unit and is protected from external influence by being arranged along at least a part of its length in the shelter of an elongate protective device arranged substantially parallel with said support member.

The device according to the invention is characterized in that said straightness reference comprises a laser beam which is generated by a laser unit comprising a laser transmitter and a receiver detector, which laser beam is protected from external influence by being arranged along at least a part of its length in the shelter of an elongate protective device arranged substantially parallel with said support member.

BRIEF DESCRIPTION OF THE DRAWINGS

The invention will be described in more detail in the following with reference to the accompanying drawings.

FIG. 3 is a front view of parts of the measuring device according to FIG. 1 seen from the front, showing said measuring beam and measuring carriage, respectively and the traversing device.

FIG. 4 is a schematic top view of parts of the traversing device according to FIG. 3.

FIG. 5 is a top view of parts of a motor included in the traversing device according to FIG. 3, seen straight from above.

FIG. 6 is a top view of parts of a retaining and adjustment member seen straight from above, included in the measuring device shown in FIG. 1 comprising a setting member and an adjustment device.

FIG. 7 is a front view of parts of the retaining and adjustment member according to FIG. 6 seen from the front, showing a number of non-contact measuring means with protective members and spacers.

FIG. 8 is a side view of parts of the retaining and adjustment member according to FIG. 6, seen from one side.

FIG. 9 is a cross section through parts of the measuring device according to FIG. 1 showing a non-contact measuring means or a protective member and spacer in its position close to the cylindrical body arranged for measurement.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
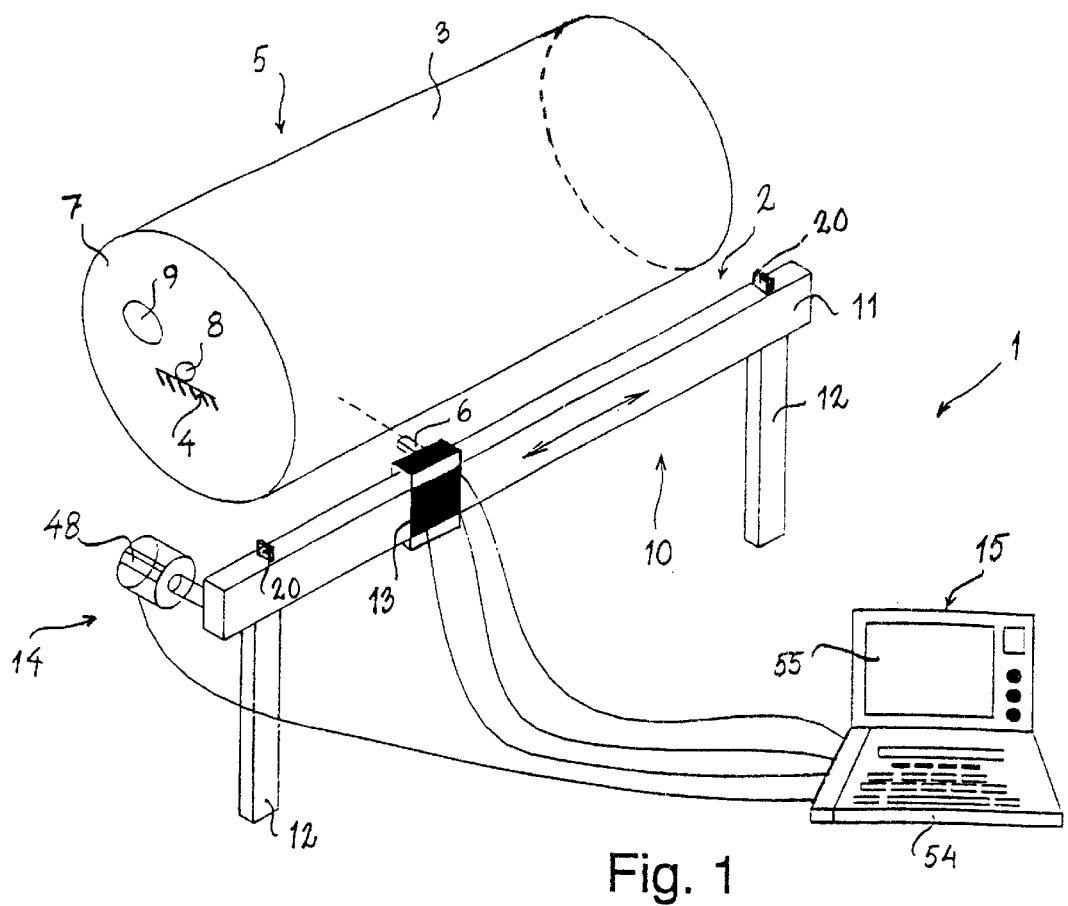
FIG. 1 is a schematic perspective view of parts of a measuring device according to the present invention, seen from one long side of the measuring device and situated close to a cylindrical body to be measured, said measuring device comprising an electronic measuring and control unit, a measuring stand, a measuring carriage including a measuring means and a traversing device for said measuring carriage.
Figure 2:
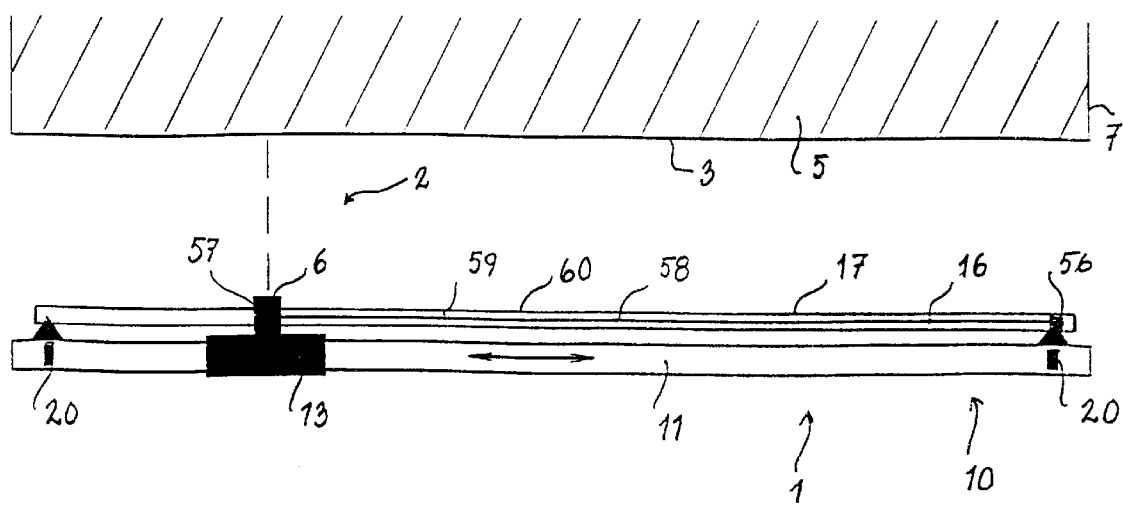
FIG. 2 is a schematic top view of parts of a measuring device according to FIG. 1 seen from above, showing a measuring beam included in said measuring stand comprising a schematic straightness reference and protective device and the measuring carriage running on the measuring beam.

FIGS. 1 and 2 show schematically in perspective parts of the measuring device 1 according to the invention for measuring without contact in a predetermined measuring area 2 at, on, around and along an envelope surface 3 of at least one measured object 5 rotatably journalled in a machine stand 4, preferably the machine stand 4 of a paper machine, to determine the cylindricity and/or straightness of said object, as well as any other desired property or determination of or at said measured object 5, such as corrosion, wear, temperature or velocity, and also suitable properties of a material web running over and around said measured object 5 deemed advantageous to determine with the aid of said measuring device 1 comprising at least one measuring means 6 suitable for the purpose.

In the embodiment shown in FIG. 1 the measured object 5 comprises a substantially cylindrical body, e.g., a roll or a cylinder, rotating about an axis of rotation 8, such as a drive shaft. At least one suitable revolution pulse device 9 is arranged close to the measured object 5, suitably at one end wall 7 or one drive shaft extension 8 so that it can be determined when the measured object 5 is at its zero or starting position, when it has rotated part of a revolution, one complete revolution or several complete revolutions. In the embodiment shown said revolution pulse device 9 may comprise an inductive transducer, suitably placed a few millimeters from said end wall 7, which reacts to a metal object arranged on the end wall, the transducer then having the advantage of an extremely short reaction time. Also, a photocell detector comprising a reflector may be arranged at the axis of rotation 8 of the measured object 5 and a transmitter placed at a relatively much greater distance, approximately 0.5–1.0 m, from the rotating body 5 than the inductive transducer. The transmitter is therefore comparatively better protected than said inductive transducer but the reaction time of the photocell detector is somewhat longer than that of said inductive transducer.

The measuring device 1 according to the invention also comprises a measuring stand 10 consisting of an elongate, rigid, i.e., form-stable, support member 11 arranged substantially parallel with the axis of rotation 8 of the measured object 5, e.g., a linear unit or a measuring beam, at each end of which measuring beam 11 an attachment means 12 is arranged. The measuring stand 10 is also provided with a linearly movably journalled measuring carriage 13 on which the measuring means 6 is arranged and which is arranged to be moved substantially parallel with said measuring beam 11, as well as a traversing device 14 to move said measuring carriage 13 to preferably predetermined, optional positions along said measuring beam 11 where measurement is desired, and an electronic measuring and control unit 15. Said measurement is performed with the aid of the non-contact measuring means 6 and a straightness reference 16 cooperating with this measuring means 6 (see FIG. 2), which straightness reference is protected and screened from external influence by an elongate protective device 17, described in more detail below, arranged substantially parallel to said measuring beam 11.

By "substantially parallel with the axis of rotation 8 of the measured object 5" it is meant that the support member 11 is arranged so that said measurements will always be performed within the measuring area of respective measuring means 6.

In the embodiment shown each of said attachment means 12 may comprise at least one leg, a support or an attachment to the machine stand 4 mentioned above, in which the cylindrical body/bodies 5 to be measured are rotatably arranged, or else to some other permanent member able to give the requisite stability for the measuring device 1, e.g., the foundation of the machine.

When using the measuring device 1 according to the invention with a Yankee cylinder 5 in a paper machine, a space is required for assembly and manipulation of the measuring carriage 13 of said measuring device 1 which is more or less accessible close to and between the Yankee cylinder 5 and the moving web. The normal placing of the measuring device in this specific case, not shown, is suitably between the creping doctor and the cleaning doctor.

In order to reduce and, as far as possible, eliminate the vibrations transmitted to the measuring device 1 through the air, for instance, or through the attachment means 12 of the measuring device 1, construction elements are used in or designed for the measuring device 1 that have or achieve considerable rigidity and/or a vibration suppressing effect.

For this reason the measuring beam 11, see FIGS. 3–5, comprises a member, or if necessary several substantially identical sections 18, form-stable in all directions and rigidly joined together coaxially and/or in parallel, which sections are suitably made of composite material or metal, preferably steel or aluminum sections, see FIG. 9. When several of the identical sections 18 must be joined together to form a coherent measuring beam 11 in order to obtain a total length corresponding to at least the length of the desired measuring area 2, generally equivalent to the extension of the measured object 5, this is suitably achieved by means of detachable joints 19, e.g., screw or bolt joints, recessed in the sides of the sections 18, see FIG. 3 so that the measuring device 1 can easily be taken apart and thus transported in an easily managed form, and also so that said detachable joints 19 shall not impede the linear travelling movement of the measuring carriage 13, for instance. Some form of stop member 20 is arranged at each end of said measuring beam 11, adjustable to optional positions along the beam, see FIGS. 1–2, suitably consisting of a part of one or more non-contact end-sensing devices comprising transducers such as photocells, inductive transducers or the like for recording the current position of said measuring carriage 13 relative a start or end position as described in more detail below. Said stop member 20 may consist of any other known type of position-recording means, e.g., electric breakers, but non-contact stop members 20 are preferable since they do not cause unfavorable influence in the form of impact jolts.

One or more linear journalling means 21, such as linear bearings or guides, are arranged along the measuring beam 11, substantially parallel thereto and at one or more of its sides. In the embodiment shown in FIG. 9 two journalling members 21 are situated, one at the upper side 22 and the other at the lower side 23 of the measuring beam 11, which journalling members 21 comprise one or more parallel guides constituting a shaped bar, slide or rail along which some form of journalling member 24 arranged on the measuring carriage 13 runs in cooperation therewith. The journalling member may consist, for instance, of a number of bogie wheels, slide, ball or roller bearings. One or more sliding surfaces 25 of some type of self-lubricating material, e.g., Teflon plastic, may be arranged between said measuring carriage 13 and measuring beam 11, suitably along the entire extension of said guides mentioned above, beside at least one or between several of these guides.

According to FIGS. 3–5 said measuring carriage 13 comprises a positioning unit 26 on which the coupling 27 for the traversing means 14 is arranged, enabling positioning of the measuring carriage 13 in a to and fro linear movement to each desired and predetermined position along one or more of the linear journalling means 21 of the measuring beam 11, suitably along one or more of the journalling means 21 arranged at the sides of the measuring beam 11 facing the measured object 5. In the embodiment shown the positioning unit 26 comprises a slide or carriage 28 in which one each of said couplings 27 for the traversing device 14 is arranged at its two opposite ends seen in the direction of travel, and also a sleeve or frame 29 surrounding the support beam 11 and connecting said carriage 28 with the other journalling means 21 described above.

In the embodiment shown in FIG. 3 a tensioning device 30 is arranged on the measuring carriage 13, at the lower edge of the frame 29, the function of the tensioning device 30 being to suitably hold and clamp the measuring carriage 13 against the measuring beam 11 during its linear movements to and fro. The tensioning device 30, which in the device shown, comprises a link arm 31 arranged pivotably at one end of the frame 29, with a suitable journalling means 32 such as a bogie wheel at its free, opposite end, which tensioning device 30 is clamped against and cooperates with the support member 11, suitably one of the linear journalling means 21 described above, of the support member 11. Said link arm 31 can then either be fixed at a specific angle by means of a screw member 33 arranged at its pivot point, or a suitable tension force can be obtained by means of a spring member, not shown, arranged together with said link arm 31.

The other, movable part of the above-mentioned non-contact end-sensing device(s) 20 is also fitted on the measuring carriage 13, which end-sensing devices 20 record the current position of the measuring carriage 13 in relation to its start or end position travelling along the measuring beam 11, so that the traversing movement can always commence and finish at a known position in relation to said end position. The measured values obtained can thus easily be compared within the same measuring sequence and also with equivalent measured values obtained during previous measurements performed on the same or other similar measured objects 5.

An adjustment member 35 is also arranged at the positioning unit 26 of the measuring carriage 13, see FIGS. 6, 8 and 9, and comprises a shaft 36 arranged in suitable manner in the longitudinal direction of the support beam 11, and at least one hinge member 37 pivotable about this shaft 36. Said hinge member 37 can be secured to the shaft 36, e.g., by a screw member 38, so that a retaining and adjustment member 39, e.g., consisting of a platform of bent sheet metal, arranged at this hinge member(s) 37, on which platform 39 the measuring means 6 is/are mounted, can be set at a desired angle to the envelope surface 3 of the measured object 5.

In order to adjust said platform 39 to a suitable distance for these measuring means 6 from said envelope surface 3 in radial direction also, a manual or automatic adjustment member 40 is arranged, in the embodiment illustrated in FIG. 9, at the lower side of said platform 39. The adjustment member 40 then comprises a spring member 41, which in the embodiment illustrated consists of a rod 42 attached to the hinge member 37 perpendicularly to the measured object 5 and parallel with said platform 39 and a forward control element 43 and a rear control element 44, both displaceable along the rod 42, which control elements 43, 44 are permanently mounted on the platform 39, the latter thus being adjustable along said rod 42, and also a spring 45 coiled around said rod 42 so that a force is obtained on the platform 39 directed against the measured object 5. A manual or automatic actuator 46, in the embodiment shown in FIG. 6, extends between said hinge 37 and the rear control element 44 and acts parallel to this spring member 41, e.g., consisting of a micrometer screw or an electric motor, so that said distance from the envelope surface 3 of the measured object 5 can be controlled, in the latter case automatically, by the measuring and control unit 15 in cooperation with said spring member 41.

One or more protective spacers 47 are fitted on the front of the platform 39, facing the measured object 5, suitably shaped as blocks of plastic, ceramic, composite or some other suitable material that does not damage the envelope surface 3 of said measured object 5 in the event of contact between them, during adjustment of said platform 39, for instance.

Said traversing device 14 comprises a motor 48, see FIG. 5, such as a stepping or servo motor, suitably arranged at one end of the measuring beam 11 for propelling said measuring carriage 13, a coupling 49 which may comprise a planetary gear, a drive shaft 50 from the motor 48 connected to one wheel, in this case constituting a driving wheel, of at least two journalling members such as wheels 51,52, between and around which wheels 51,52 at least one synchronous transmission belt 53 runs in a loop in a completely or partially sheltered position inside the support member 11, and each of the above-mentioned coupling 27 between the ends of the transmission belt 53 and the positioning unit 26 of said measuring carriage 13. Said coupling 27 is suitably designed with some form of means to regulate the tension in the transmission belt 53.

The described motor 48, with all movable parts carefully enclosed to protect them from external influence of dust, fluff, etc., is controlled so that it automatically adjusts the measuring carriage 13 with the aid of the transmission belt 53 to any desired position along the measuring beam 11, instead of the previous complicated and in some cases dangerous method of pushing the measuring carriage 13 manually.

The electronic measuring and control unit 15 used in the measuring device 1 for controlling said motor 48, collecting the measured values obtained by the measuring means 6 and presenting the calculated results, comprises a computer 54 with a pre-programmed measurement collection card suitably in the form of an insert card for the computer. The computer 54 is specially designed for recording measurement data from different forms and types of transducers, including the requisite data processing of said measured values, and suitably presents the result either visually on a display screen 55 or in the form of a data print-out. The computer 54 may also include a calibrating unit for the straightness reference 16.

In the embodiment shown, the straightness reference 16 comprises a laser beam 58 generated by at least one laser unit comprising a laser transmitter 56 and a receiver detector 57, see FIG. 2, said laser unit also including a correction and control device, not shown, enabling adjustment of the direction of the laser beam 58 to be performed with the aid of two differential micrometer screws. This fine adjustment allows an accuracy of adjustment of 0.001 mm per meter. In the embodiment shown the laser detector 57 comprises a 2-axis, position-sensitive receiver with a detector surface of 20×20 mm, said receiver having a display box with two display windows showing the x and y values, respectively, of the detector 57 in digital form with a resolution of 0.01 mm.

To enable the whole straightness reference 16 or a part of it, as well as preferably also the laser unit with one, several or all its parts, to be screened off from all external influence such as air turbulence, temperature fluctuations, collected dust, paper fluff and liquid sprayed from the paper web, etc. an elongate protective device 17, mentioned above, is arranged below at least a part of the length of the laser beam 58 substantially parallel with the measuring beam 11. In the embodiment described this protective device 17, which may be telescopic, comprises a laser path 59 constituting some form of an extended member 60 inside which, or sheltered by which, the laser beam 58 extends, such as a screen, hollow beam, pipe or boom at least partially surrounding or in some other way protecting the laser beam 58. Alternatively the protective device may comprise a resilient bellows, suitably of plastic or rubber, which laser path 59 thus forms an undisturbed light channel for the laser beam 58 between its transmitter 56 and receiver 57, said extended member 60 having at least one gap, sector or groove, not shown, running horizontally along one side and extending at least along the part(s) of the member 60 located between the end positions applicable for traversing of the measuring carriage 13, said gap suitably being screened from the outer of two or more coaxial brush members arranged preferably parallel to each other on each side of said gap thereby forming a soft, flexible curtain which screens and closes the gap in a plastic and yielding manner. The purpose and function of said brush members is to protect the straightness reference 16 arranged in the shelter of, or inside the protective device 17, the elongate protective device 17 thus forming a space constituting said light channel in the center of which the detector 57 or laser transmitter 56 are arranged or operate.

Either the laser transmitter 56 or the receiver detector 57 is mounted on the measuring carriage 13 and the remaining either receiver detector 57 or laser transmitter 56 is mounted on the measuring beam 11, protected from external influence, after having been accurately adjusted with the aid of said correcting and control devices.

When measuring the cylindricity or, if preferred, the non-cylindricity, the differences are thus measured in the distance between the envelope surface 3 of the measured object 5 and the measuring means 6, the measuring means 6 being maintained in one and the same stationary position on the measuring beam 11 throughout a complete rotation of the measured object 5. Measuring is suitably performed in such a way that a measured value is obtained both for each degree of rotation during a revolution so that the mentioned non-cylindricity can be obtained, and also for a number of positions along the measuring beam 11 where the location of the measuring means 6 in relation to the straightness reference 16 is determined, so that the straightness profile of the measured object 5 can also be obtained. The number of measuring positions is determined by the length of the measured object 5 and the required accuracy of the measuring result.

The measuring results thus automatically collected, analyzed and suitably processed may be reported both in real time, in the embodiment shown on said display screen 55 included in the control and measuring unit 15, graphically in the isometric form described above for instance, or in tabular form, and also on a unit, e.g., a printer, connected thereto. If appropriate, said measurement and reporting may be performed for different operating conditions such as web speed, temperature or some other parameter of significance to operation.

The measuring device 1 according to the embodiment illustrated is dismountable and can therefore be packed up and simply moved when necessary between different measured objects 5 or machines, and installed at the measured object 5 selected, e.g., a Yankee cylinder, where said measurement can be performed during manufacture, in connection with service and repair or even during operation of the finished and installed cylindrical body 5.

Since sufficient and relatively accessible space for mounting and handling the measuring device 1 and measuring carriage 13 is required close to and between the Yankee cylinder and the web draw, the measuring device 1 is normally placed between the creping and cleaning doctors. If necessary it is also possible to measure through the web and a position both before and after the pickup doctor may therefore be used.

All transducers or similar measuring means used in the measuring device 1 are suitably non-contacting transducers, e.g., optical, photo-electric or inductive eddy-current transducers of known type, but may of course be entirely or partially replaced with electric, mechanical or pneumatic contact means if deemed sufficient.

If the above-mentioned revolution pulse device 9 is placed on the axis of rotation 8 of the measured object 5, in this case suitably said photocell detector, it can suitably be attached to said shaft 8 by means of a belt-like attachment member to facilitate mounting and dismantling of said revolution pulse device 9.

The measurement of the cylindricity and/or straightness of a measured object 5 can of course also include simultaneous recording of any other required parameter possible and desirable for measured objects 5 of this type, using one of the measuring devices now commercially available. Such parameters are mentioned above and include deposits, corrosion, wear patterns, magnitude of wear, etc. The described invention is particularly suitable for measuring at a Yankee cylinder.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A measuring device for an envelope surface of a generally cylindrical object journalled rotatably in a machine stand of a paper machine, said measuring device comprising:
    a measuring stand arranged generally parallel to the axis of the cylindrical object;
    a linearly movable measuring carriage for traversing along said measuring stand;
    means for measuring the envelope surface, said means being mounted to said carriage to traverse along the length of the cylindrical object and thereby measure the envelope surface;
    a straightness reference device for providing a straightness reference for said measuring means, said straightness reference device comprising;
        a laser transmitter for creating a straight laser beam, and
        a receiver detector for receiving the laser beam, one of said transmitter and said receiver detector being supported by said carriage and the other being supported at a fixed position adjacent the cylindrical object, said receiver detector being capable of providing a signal indicative of the position of incidence of the laser beam on the receiver detector such that a straightness reference is established; and
    an elongate protective device arranged along the measuring stand for protecting at least a portion of the laser beam from external influences.

2. A measuring device as defined in claim 1 wherein the laser transmitter and receiver detector are arranged inside the elongate protective device.

3. A measuring device as defined in claim 1 wherein the measuring means includes an electronic measuring and control unit.

4. A measuring device as defined in claim 1 further comprising an automatic traversing device to set said measuring carriage in desired measuring positions along said measuring stand, said traversing device comprising:
    a pair of spaced apart wheels;
    a motor arranged at one end of the measuring stand and in driving engagement with one of the wheels; and
    at least one synchronous transmission belt running in a loop around the wheels and connected to the measuring carriage such that operation of the motor causes the carriage to traverse the measuring stand.

5. A measuring device for an envelope surface of a generally cylindrical object journalled rotatably in a machine stand of a paper machine, said measuring device comprising:
    a measuring stand arranged generally parallel to the axis of the cylindrical object, said measuring stand comprising;
        a support member that comprises one or more form-stable, substantially identical sections joined together by means of suitable joints to form a coherent length corresponding to at least the length of the desired measuring area, which joints are recessed in the sides of the sections;
        a stop member arranged at each end of said support member, said stop member comprising contact-free end-sensing devices for recording the current position of said measuring carriage relative to a reference position along the support member; and
        linear journalling means arranged substantially parallel with and close to the support member, said journalling means comprising an elongate member along which journalling members arranged on the measuring carriage are arranged to move;
    a linearly movable measuring carriage for traversing along said measuring stand;
    means for measuring the envelope surface, said means being mounted to said carriage to traverse along the length of the cylindrical object and thereby measure the envelope surface; and
    a straightness reference device for providing a straightness reference for said measuring means, said straightness reference device comprising;
        a laser transmitter for creating a straight laser beam, and
        a receiver detector for receiving the laser beam, one of said transmitter and said receiver detector being supported by said carriage and the other being supported at a fixed position adjacent the cylindrical object, said receiver detector being capable of providing a signal indicative of the position of incidence of the laser beam on the receiver detector such that a straightness reference is established.

6. A measuring device as defined in claim 5 wherein said carriage comprises a frame surrounding the support member and positioning said journalling members for engagement with the elongate member.

7. A measuring device as defined in claim 5 wherein a tensioning device is arranged on the measuring carriage, said tensioning device comprising a link arm arranged pivotably at one end on the carriage and with a journalling means at its free, opposite end, which tensioning device is clamped against and cooperates with the support member.

8. A measuring device as defined in claim 5 further comprising an adjustment member arranged on the measuring carriage, said adjustment member comprising a shaft arranged in the longitudinal direction of the measuring stand and at least one hinge member pivotable about this shaft, which can be secured to the shaft so that a retaining member for retaining the measuring means can be mounted thereto and set at a desired angle relative to the envelope surface of the cylindrical object.

9. A measuring device as defined in claim 8 further comprising an adjustment member arranged at said retaining member to adjust the retaining member in a radial direction to a suitable distance for said measuring means from said envelope surface, said adjustment member comprising a spring member so that a force is obtained directed on the retaining member and against the cylindrical object, and an actuator acting parallel to this spring member so that said distance from the envelope surface can be controlled by the measuring and control unit in cooperation with said spring member.

10. A measuring device as defined in claim 8 further comprising at least one protective spacer fitted on the front of the retaining member facing the cylindrical object and suitably shaped as a block of a material that would not damage the envelope surface of said cylindrical object in the event of contact between them.

11. A measuring device as defined in claim 8 wherein the retaining member comprises a platform of bent sheet metal.

12. A measuring device as defined in claim 1 wherein that the protective device is telescopic.

13. A measuring device as defined in claim 1 wherein the protective device is selected from the group consisting of a screen, hollow beam, pipe, and bellows.

14. A straightness reference device for improving the accuracy of a device which traverses and measures an envelope surface of a generally cylindrical object journalled rotatably in a machine stand of a paper machine, said device comprising:

a laser transmitter for creating a straight laser beam;

a receiver detector for receiving the laser beam, one of said transmitter and said receiver detector being supported on the traversing measuring device and the other being supported at a fixed position adjacent the cylindrical object, said receiver detector being capable of providing a signal indicative of the position of incidence of the laser beam on the receiver detector such that a straightness reference is established; and an elongate protective device arranged along the measuring stand for protecting at least a portion of the laser beam from external influences.

15. A straightness reference device as defined in claim 14 wherein the laser transmitter and receiver detector are arranged inside the elongate protective device.

16. A method of measuring an envelope surface of a generally cylindrical object journalled rotatably in a machine stand of a paper machine, said method of measuring comprising:

moving a measuring carriage along a measuring stand arranged generally parallel to the axis of the cylindrical object such that the carriage traverses the envelope surface;

measuring the envelope surface from the carriage so that measurements can be obtained from points along the length of the envelope surface;

aiming a laser beam in a direction between the measuring carriage and a point adjacent the cylindrical object;

using the laser beam as a straightness reference for said measuring step; and enclosing the laser beam within an elongate protective device to protect the laser beam from external influences.

17. A method of measuring an envelope surface of a generally cylindrical object journalled rotatably in a machine stand of a paper machine, said method of measuring comprising:

moving a measuring carriage along a measuring stand arranged generally parallel to the axis of the cylindrical object such that the carriage traverses the envelope surface;

measuring the envelope surface from the carriage so that measurements can be obtained from points along the length of the envelope surface;

aiming a laser beam in a direction between the measuring carriage and a point adjacent the cylindrical object;

using the laser beam as a straightness reference for said measuring step; and sensing the rotational position of the cylindrical object with a revolution pulse device.

18. A method of measuring an envelope surface of a generally cylindrical object journalled rotatably in a machine stand of a paper machine, said method of measuring comprising:

moving a measuring carriage along a measuring stand arranged generally parallel to the axis of the cylindrical object such that the carriage traverses the envelope surface and sensing when the carriage approaches the end of the cylindrical object without mechanically contacting the carriage;

measuring the envelope surface from the carriage so that measurements can be obtained from points along the length of the envelope surface;

aiming a laser beam in a direction between the measuring carriage and a point adjacent the cylindrical object; and using the laser beam as a straightness reference for said measuring step.

19. A method as defined in claim 16 wherein said laser beam aiming step is performed with a laser transmitter and receiver detector both positioned within the elongate protective device.

20. A method as defined in claim 17 further comprising processing the envelope surface measurements and straightness reference with an electronic measuring and control unit.

21. A method as defined in claim 17 wherein said moving step further comprises moving the carriage intermittently from one predetermined position to another predetermined position so that the measuring step can be performed while the carriage is stopped.

22. A method as defined in claim 17 further comprising the step of adjusting the carriage so that the measuring step can be performed at a desired angle relative to the envelope surface.

23. A method as defined in claim 17 further comprising the step of adjusting the carriage so that the measuring step can be performed at a desired distance from the envelope surface.

24. A method as defined in claim 17 wherein said measuring step further comprises measuring more than one physical parameter of the cylindrical object.

* * * * *